United States Patent Office 3,467,865
Patented Sept. 16, 1969

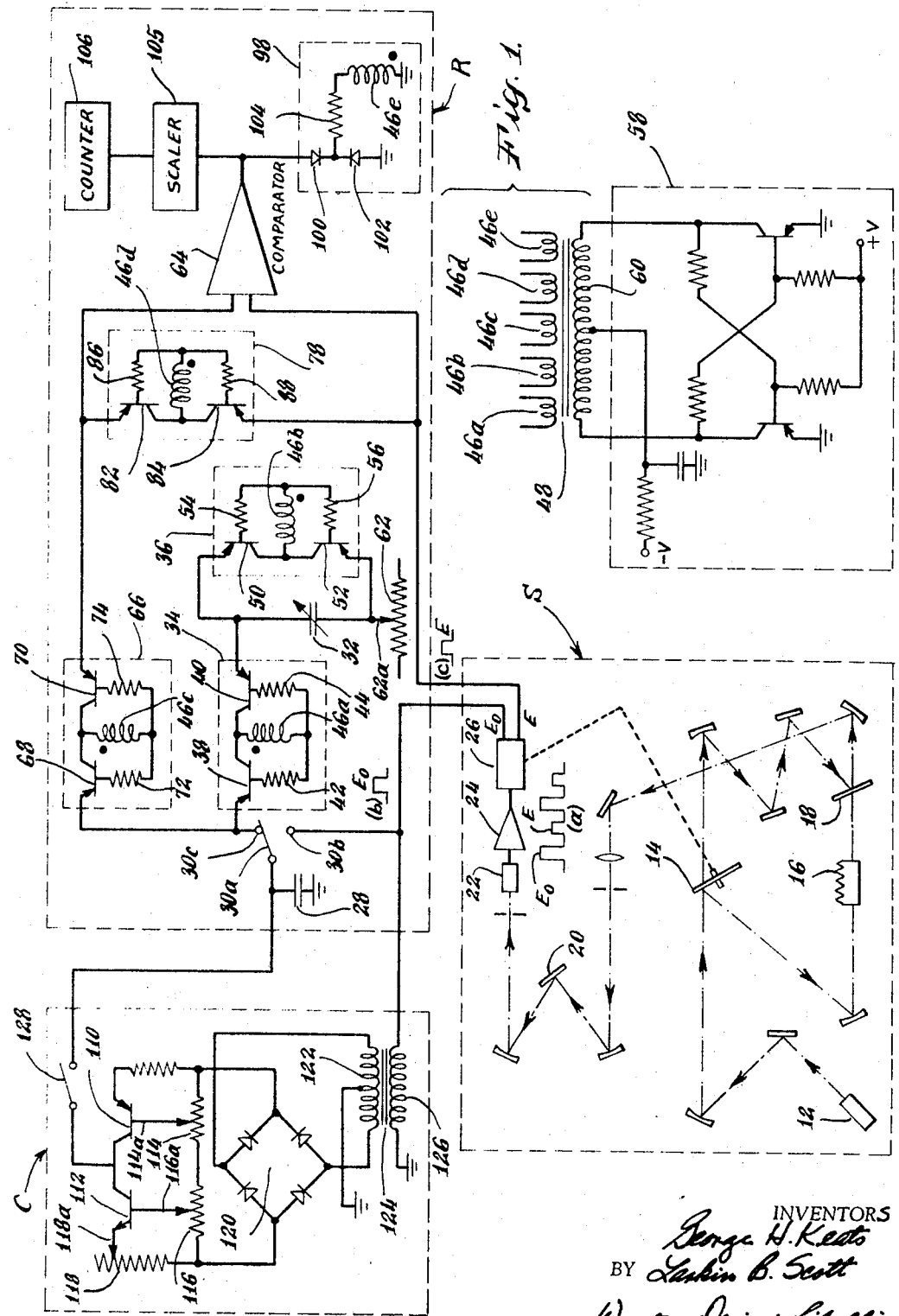

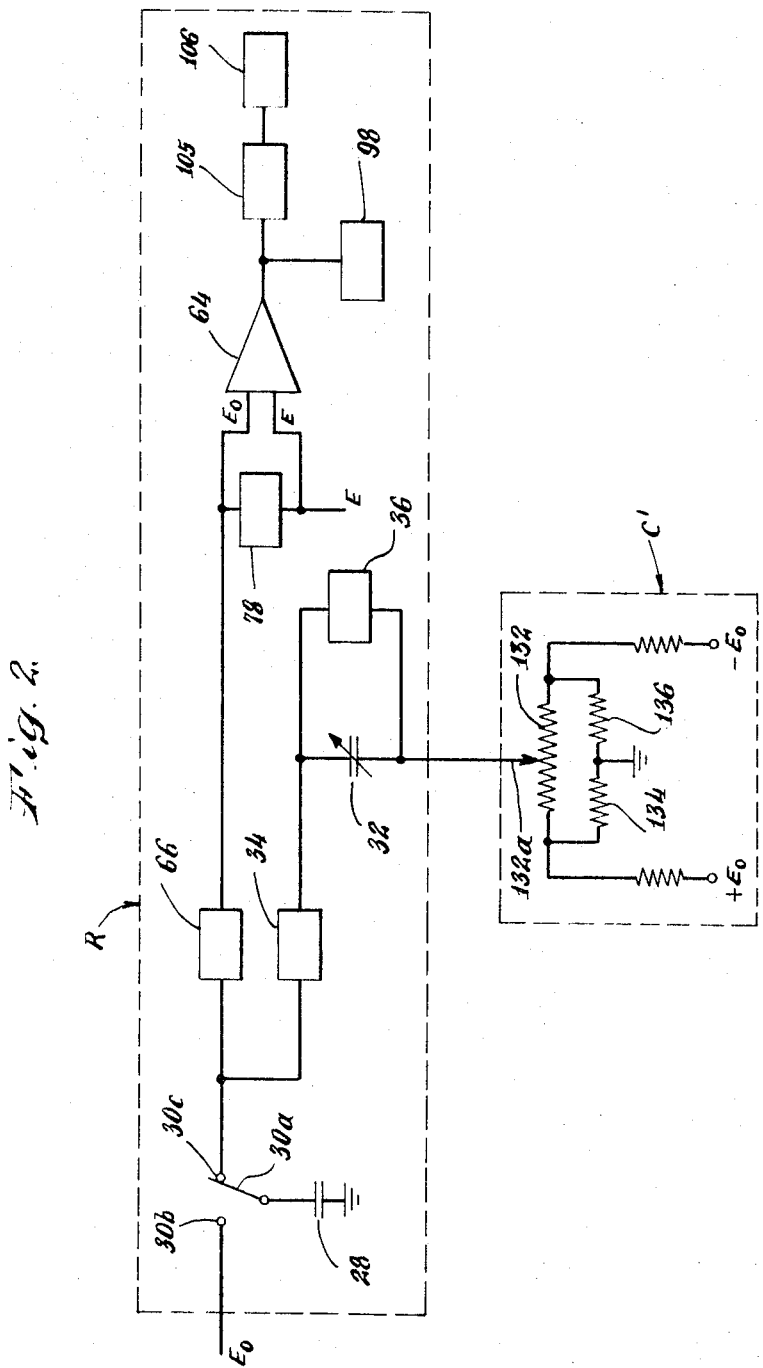

3,467,865
LOGARITHMIC RATIOMETER WITH DIGITAL OUTPUT
Larkin B. Scott and George H. Keats, Fort Worth, Tex., assignors to The Perkin-Elmer Corporation, Norwalk, Conn., a corporation of New York
Filed Dec. 23, 1965, Ser. No. 515,949
Int. Cl. G01r 7/04
U.S. Cl. 324—140                                10 Claims

ABSTRACT OF THE DISCLOSURE

A circuit having an output representative of the logarithm of the ratio of two voltages. A first capacitor is charged to the higher of the two voltages. The first capacitor is then discharged by periodically connecting it across a smaller capacitor which, in turn, is discharged between such periodic connections. A comparator circuit compares the voltage across the first capacitor with a reference voltage and activates a counter with each discharge of the first capacitor. The number of steps required to discharge the first capacitor to the reference voltage level is displayed by the counter as the desired output. Curvature correction is provided either by injecting a steady current flow into the first capacitor or by biasing the second capacitor from ground.

---

This invention relates to a digital concentration readout system and, more particularly, to such a system which is particularly well adapted for use with spectrophotometers.

In certain double beam radiation comparison systems which are known at the present time, an attenuator wedge moves into and out of the reference beam in response to the amount of energy absorbed from the sample beam by a sample. The system seeks to achieve equality of intensity of the sample and reference beams at the detector. Therefore, as the sample under analysis absorbs a certain amount of the sample beam energy, the attenuator wedge moves into the reference beam so as to reduce the intensity of the reference beam. Useful data as to the amount of transmission of the sample beam through the sample is obtained from the position of the attenuator wedge. An electrical signal proportional to the amount of transmission of the sample beam may be provided by simply connecting a potentiometric device to the moving attenuator wedge. As the attenuator wedge moves, a varying electrical signal is developed by the potentiometric device which is, therefore, proportional to the amount of radiation absorbed by the sample.

Still another type of radiation comparison system which has received wide acceptance is the atomic absorption spectrophotometer. This instrument is used to determine the concentration of specific constituents of a sample. This is accomplished by atomizing the sample in a flame and passing through the flame radiation containing the wavelength representative of the constituent. In the double beam system, a chopper is employed to separate the source radiation into a reference and a sample component. Only the sample component passes through the flame. Thereafter, the two components are recombined and passed to a detector and an amplifier. After amplification, the electrical signals are separated to provide a first voltage proportional to the reference beam intensity and a second voltage proportional to the sample beam intensity.

Transmission T is defined by the following ratio:

$$T = E/E_o \qquad (1)$$

where E is proportional to the sample beam intensity at the detector and $E_o$ is proportional to the reference beam intensity. It is apparent that a properly calibrated conventional metering device may be made to respond to the electrical signal which varies in accordance with the ratio of E to $E_o$ to provide an indication of the transmission of the system for a particular sample.

Oftentimes, however, it is desirable to provide a direct readout of concentration $c$ when input signals proportional to E and $E_o$ are supplied. The relationship is supplied by the well known Lambert-Beer law:

$$\alpha l c = \log_{10} \frac{E_o}{E} \qquad (2)$$

where the extinction coefficient, $\alpha$ is a constant depending only on the wavelength of the radiation and the nature of the sample and $l$ is the path length through the sample.

If the Lambert-Beer law were the only factor governing the intensity of sample beam radiation reaching the detector, the readout problem would resolve itself into one of merely obtaining a number proportional to the logarithm of the ratio of two intensities. This number should preferably be in digital form. However, prior art devices capable of performing this function have been deficient in that they are mechanically complex and cumbersome and require special gated counters. Furthermore, departures from the Lambert-Beer law occur whenever the relationship between measured absorbance and concentration is nonlinear. Such "nonlinearities" are more often apparent than real and may be ascribed to any of several factors. For example, one problem in an atomic absorption instrument is that source radiation may be detected that has not passed through the flame. Regardless of the cause, however, the result is a change in the curvature of the lagorithmic concentration-intensity curve expressed by Equation 2. The present invention is particularly well suited to develop a corrected indication of concentration from an input signal proportional to intensity.

Accordingly it is an object of the present invention to provide an improved logarithmic ratiometer. Another object is to provide such a ratiometer which has means for curvature correction.

Another object of the present invention is to provide a digital concentration readout for a radiation comparison system. Other objects, features and advantages will be apparent from the following description, the appended claims, and the figures of the attached drawings wherein:

FIG. 1 illustrates a logarithmic ratiometer, including curvature correction means, in accordance with the present invention, connected to the output of a radiation comparison system; and FIG. 2 is a circuit in block diagram form, similar to that of FIG. 1 but illustrating a modified form of curvature correction.

Referring to FIG. 1, there is illustrated a logarithmic ratiometer R connected to the output of an atomic absorption spectrophotometer S and including a curvature correction circuit C. The spectrophotometer is conventional and need not be described in detail. It includes a source 12 of radiation which projects a beam of radiation against a chopper 14. The chopper forms a reference and a sample beam, each of which is made up of segments displaced in time from the segments of the other beam. The sample beam passes through a flame 16 within which is atomized the sample being tested. The sample and reference beams are recombined by a half-silvered mirror 18 and the composite beam is directed, by means of various optical elements including an optical grating 20, to a detector 22. The output from the detector is amplified by amplifier 24, which has an output similar to that shown by wave-shape $a$. Wave-shape $a$ indicates an output consisting of alternate pulses $E_o$, having an intensity proportional to the reference beam, and E, having an intensity proportional to that of the sample beam.

This output passes to a signal separator 26 which is driven at the same frequency as the chopper 14 and provides a signal $E_o$, shown by wave form $b$, and a signal E, shown by wave form $c$.

Logarithmic ratiometer

Referring to the drawing, a logarithmic ratiometer R constructed according to the present invention includes a storage capacitor 28 and means for charging capacitor 28 to a first voltage. The charging of capacitor 28 may be accomplished by connecting the source of reference voltage $E_o$ to capacitor 28 through a switch blade 30$a$ in contact with a switch terminal 30$b$. The switch identified by elements 30 may be, for example, a mercury reed relay driven at a desired sampling rate. After capacitor 28 is charged to a level equal to the level of reference voltage $E_o$, switch blade 30$a$ is switched to the position shown in the drawing so that it is in contact with a switch terminal 30$c$.

The logarithmic ratiometer R includes means for discharging capacitor 28 in steps. The discharge of capacitor 28 is accomplished by repeatedly connecting a smaller discharge capacitor 32 across capacitor 28 so as to charge capacitor 32 and thereafter repeatedly discharging capacitor 32 after each time that it has been charged. The result is that capacitor 28 is discharged in a series of steps, each step having a fixed percentage of the voltage on capacitor 28. The actual sizes of the capacitors is, of course, subject to considerable design variation. However, in one embodiment, storage capacitor 28 has a value of 10 $\mu$f. and discharge capacitor 32 a value of .0225 $\mu$f. This repetitive charging and discharging of capacitor 28 is effected by a pair of chopping circuits 34 and 36. Chopping circuit 34 may include a pair of transistors 38 and 40, a pair of base resistors 42 and 44, and a transformer winding 46$a$. The emitter electrode of transistor 38 is connected to capacitor 28 through switch blade 30$a$ and terminal 30$c$. The emitter electrode of transistor 40 is connected to capacitor 32. Transformer winding 46$a$ is one of five secondary windings of a transformer 48. Chopping circuit 36, similar in construction to chopping circuit 34, is connected across capacitor 32. Chopping circuit 36 may include a pair of transistors 50 and 52, a pair of base resistors 54 and 56, and a transformer winding 46$b$. Transformer winding 46$b$ is the second of the five secondary windings of transformer 48.

An oscillator 58 of conventional construction and operation supplies a series of pulses to primary winding 60 of transformer 48 which pulses are, in turn, coupled to the secondary windings 46$a$–46$e$ inclusive. These pulses are effective in rendering the transistors of chopping circuits 34 and 36 conductive. This causes a direct connection from terminal 30$c$ to capacitor 32 and a second direct connection across capacitor 32. The dots adjacent secondary windings 46$a$ and 46$b$ are the conventional polarity symbols. They indicate that the signals across these secondary windings are of opposite phase so that, when the transistors of chopping circuit 34 are rendered conductive, the transistors of chopping circuit 36 are rendered nonconductive and, when the transistors of chopping circuit 36 are rendered conductive, the transistors of chopping circuit 34 are rendered nonconductive. Thus, it is seen that, after capacitor 28 is charged to $E_o$, it is discharged in steps at a rate equal to the repetition rate of oscillator 58. This result is accomplished by alternately connecting capacitor 28 to capacitor 32 through chopping circuit 34 to charge capacitor 32 and by creating a direct connection across capacitor 32 by the action of chopping circuit 36 so as to discharge capacitor 32 after each time that it has been charged. A potentiometric device 62, having its wiper 62$a$ connected to one side of capacitor 32, is provided for purposes of calibration.

At this point it is worthwhile to consider the mathematics involved with the operation just described. At the outset, capacitor 32 is completely discharged and the charge on capacitor 28 is:

$$Q_o = C_{28} E_o \qquad (3)$$

During the first discharge step of capacitor 28, the charge on capacitor 32 will become $C_{32} E_1$ where $E_1$ is the new voltage across both capacitors 28 and 32 during the interval they are connected together. The new charge on capacitor 28 will be:

$$Q_1 = C_{28} E_1 = Q_o - C_{32} E_1 = C_{28} E_o - C_{32} E_1 \qquad (4)$$

Rearranging Equation 4 and eliminating the Q terms:

$$E_o = \frac{C_{28} + C_{32}}{C_{28}} E_1 = K_1 E_1 \qquad (5)$$

where $K_1$ equals $$\frac{C_{28} + C_{32}}{C_{28}}$$

After the second discharge step of capacitor 28, the voltage $E_2$ across the two capacitors would be similarly related to $E_1$ by:

$$E_1 = K_1 E_2 \qquad (6)$$

Substituting for $E_1$ in Equation 5:

$$E_o = K_1^2 E_2 \qquad (7)$$

For $n$ discharges of capacitor 28:

$$E_o = K_1^n E_n \qquad (8)$$

Rearranging Equation 8:

$$K_1^n = \frac{E_o}{E_n} \qquad (9)$$

Equation 9 may be expressed in the following way:

$$\log_{10} \frac{E_o}{E_n} = n \log_{10} K_1 \qquad (10)$$

Solving for $n$ in Equation 10:

$$n = \frac{\log_{10} \frac{E_o}{E_n}}{\log_{10} K_1} = \frac{\log_{10} \frac{E_o}{E_n}}{K_2} \qquad (11)$$

Equation 11 indicates that the total number of discharge steps $n$ is proportional to the logarithm of $E_o/E_n$ where $E_n$ is the voltage level to which capacitor 28 has discharged after $n$ discharge steps.

The logarithmic ratiometer R constructed according to the present invention further includes means for receiving a second voltage. This second voltage may be the voltage E supplied by spectrophotometer S which is proportional to the sample beam intensity at the detector.

The logarithmic ratiometer additionally includes means for comparing the diminishing voltage across capacitor 28 with the second voltage E. The object is to determine when the voltage across capacitor 28 has discharged to a level equal to the amplitude of voltage E. When this condition is reached:

$$n = \frac{\log_{10} \frac{E_o}{E}}{K_2} \qquad (12)$$

so that the total number of discharge steps $n$ is proportional to a constant times the logarithm of $E_o/E$, which is a measure of the concentration $c$.

The comparison between the voltage across capacitor 28 as it discharges and the voltage E may be performed by a comparator 64 of conventional design and operation. Comparator 64 is essentially a differential amplifier. The voltage across capacitor 28 is supplied to one of the inputs of comparator 64 through a third chopping circuit 66 while the voltage E is supplied directly to another input of the comparator. Chopping circuit 66, similar in construction and operation to chopping circuits 34 and 36, may include a pair of transistors 68 and 70, a pair of base resistors 72 and 74, and a transformer winding 46$c$ which is the third of the secondary windings of transformer 48. The polarity symbol associated with transformer winding 46c indicates that the capacitor 28 is connected to comparator 64 at the same times that it is connected to capacitor 32. This means that the comparator 64 makes a comparison between the amplitude of the voltage E and the voltage across capacitor 28 for every discharge step of capacitor 28.

In addition to making comparisons between the voltage across capacitor 28 and the voltage E, comparator 64 generates a series of pulses, one for each discharge step of capacitor 28. These pulses are used to count the number of discharge steps of capacitor 28 required to reduce the voltage across the capacitor from a selected level to a level equal to the amplitude of the voltage E. For the embodiment of the invention presently being considered, the selected level at which the count is commenced is the level $E_o$ to which capacitor 28 has been charged.

During comparisons of the voltage across capacitor 28 and the voltage E, comparator 64 develops pulses of either positive or negative polarity which vary in amplitude from comparison to comparison since, as the capacitor 28 discharges, the voltage across the capacitor approaches the level of the voltage E and, therefore, the difference between the two changes continuously.

Between comparisons the output signal from comparator 64 is driven to zero through the action of a fourth chopping circuit 78 which is connected across the input terminals of the comparator. Chopping circuit 78, which is similar in construction and operation to chopping circuits 34, 36, and 66, may include a pair of transistors 82 and 84, a pair of base resistors 86 and 88, and a transformer winding 46d which is the fourth of the secondary windings of transformer 48. Whenever pulses developed by oscillator 58 are coupled to secondary winding 46d, chopping circuit 78 effects a direct connection across the input terminals of comparator 64. It will be seen from the polarity symbol adjacent winding 46d, that this direct connection exists between comparisons of the voltage across capacitor 28 and the voltage E. When this direct connection across the input terminals of comparator 64 is effected, the output of the comparator is driven to zero, since the two inputs to the comparator are equal.

When the voltage across capacitor 28 drops to a level equal to the amplitude of the voltage E, it is necessary to suppress either the generation of additional pulses or the further discharge of capacitor 28. For the embodiment shown in FIG. 1, means are included for suppressing the generation of pulses after the voltage across capacitor 28 drops to a level equal to the amplitude of the voltage E. This is accomplished by a clamping circuit 98 which may include a pair of diodes 100 and 102, a resistor 104 and a transformer winding 46e which is the fifth of the secondary windings of transformer 48. It is assumed that, for the particular design employed for the comparator 64, negative pulses are developed by the comparator so long as the amplitude of voltage E is less than that of the voltage across the capacitor 28. When a reversal takes place, that is, when the level of the voltage across capacitor 28 drops below the amplitude of voltage E, the pulses developed by comparator 64 would be of positive polarity. However, the clamping circuit 98 clamps the output of comparator 64 to ground whenever positive pulses would be developed so that the clamping circuit is effective to suppress the generation of additional pulses after the level of the voltage across capacitor 28 drops below the amplitude of voltage E. The polarity symbol adjacent winding 46e indicates that a negative pulse is coupled through resistor 104 to the junction of diodes 100 and 102 every time a pulse is, or would be, generated by the comparator 64. This negative pulse drives the junction of the diodes to ground since diode 102 is rendered conductive. So long as the comparator 64 generates negative pulses, they are passed to the scaler 105, since diode 100 remains open. However, as soon as the comparator develops positive pulses, diode 100 is rendered conductive and the positive pulses are shorted to ground. The output of comparator 64 thereafter remains at ground potential.

The logarithmic ratiometer R further includes means for counting the number of pulses generated by the comparator 64 from the start of the discharge of capacitor 28 until the voltage across the capacitor drops to a level equal to the amplitude of voltage E. This counting of pulses may be performed by a scaler 105 and a counter 106. The function of the scaler is to reduce the number of pulses passed to the counter by a selected percentage for purposes of averaging, as will be later explained. The combination of the comparator 64 and clamping circuit 98 permits use of a standard ungated counter.

In certain applications, difficulties may be encountered in charging capacitor 28 precisely to the required level. One skilled in the art will readily appreciate the problems involved. In order to overcome any such difficulties, capacitor 28 may be charged beyond the required level, that is, beyond a level representative of the numerator of the ratio, and then permitted to discharge with the counter 106 commencing its count when the charge of the capacitor passes through the level corresponding to the value of the numerator of the ratio. Such a modification to the apparatus shown in FIG. 1 would essentially involve only an additional comparator to compare the voltage across capacitor 28 with a standard or reference corresponding to the value of the numerator of the ratio, along with some means for controlling the counter 106 by this additional comparator so as to commence the count at the proper time.

Curvature control

The curve of absorbance versus concentration should ideally be linear. If this were the case the ratiometer which has been thus far described would be fully capable of making accurate concentration determinations from the output of a spectrophotometer. However, as has been pointed out above, it is true of spectrophotometers in general that certain nonlinearities are present. One of the Beer's law nonlinearities is due to detected but unabsorbed energy (such as ambient radiation or radiation from the source that does not pass through the sample). There will thus be a certain amount of unwanted energy in each of the sample and reference beams. The nature of the ratiometer described above is such that its output is always representative of a logarithmic function. However, the nonlinearity in the absorbance-concentration curve causes a variation from the logarithmic ideal. Two curvature control circuits are described herein for correcting the ratiometer output from the logarithmic.

In the circuit of FIG. 1 there is illustrated a curvature control circuit C which functions by introducing into capacitor 28 a steady current flow which is proportional to the reference voltage $E_o$. Thus capacitor 28 is charged linearly while it is simultaneously being discharged in an exponential manner. This has the effect of causing the discharge characteristic to differ from the logarithmic curve and causing a greater number of charge-discharge cycles to occur before a given voltage coincidence level is achieved. Circuit C comprises a PNP transistor 110 and an NPN transistor 112 which are connected in the common collector mode to form a complementary emitter follower. The base of transistor 110 is connected to the wiper arm 114a of a potentiometer 114. The base of transistor 112 is connected to the wiper arm 116a of a potentiometer 116 which is connected in series with potentiometer 114. The emitter of transistor 112 is connected to the wiper arm 118a of a potentiometer 118. For the embodiment of FIG. 1, the power supply for the emitter-follower circuit is derived from a full wave bridge rectifier 120, which, in turn, is supplied with alternating current from the secondary winding 122 of a transformer 124. The primary winding 126 of the transformer receives the pulses $E_o$ from separator 26. An on-off switch 128 disconnects the curvature control circuit C from capacitor 28 when desired. The wiper arms 114a and 116a function to adjust the degree of curvature control. The potentiometer 118 serves to control the maximum limit of correction.

In FIG. 2 there is illustrated a ratiometer R having a curvature control circuit C' which achieves the same result as curvature control circuit C. However, in this modification, capacitor 32 is biased from ground by an amount proportional to a fraction of the reference voltage $E_o$. The ratiometer R itself is essentially similar to that of FIG. 1 and, accordingly, is illustrated in block diagram form, the blocks having the same numbers as their corresponding elements in FIG. 1. In this embodiment, capacitor 32 discharges into a wiper arm 132a of potentiometer 132. Resistors 134 and 136 are connected in series with one another and in parallel with potentiometer 132 and their midpoint is grounded. The parallel circuit is connected with positive reference voltage to one end and negative reference voltage to the other. It will thus be seen that movement of wiper arm 132a from the midpoint on potentiometer 132 will effect either positive or negative curvature control, depending upon which direction the wiper arm is moved.

Extinction coefficient correction

It will be noted from FIG. 1 that the discharge capacitor 32 is indicated as being variable. In an actual embodiment, this may take the form of several such capacitors which may be selectively paralleled. This feature accomplishes a very important objective. From Equation 2, it will be noted that the concentration $c$ may be expressed as:

$$c = \frac{1}{\alpha l} \log_{10} \frac{E_o}{E}$$

Thus, concentration is dependent on the extinction coefficient $\alpha$. The curve of absorbance versus concentration units is linear and has its origin at zero. However, changes in $\alpha$ cause the slope of the curve to vary. The slope is also adjustable by varying the capacitance of capacitor 32 making it possible to compensate for any changes in the extinction coefficient.

Averaging

It has been previously pointed out that a scaler 105 may be employed in conjunction with counter 106. The scaler operates in conjunction with switch blade 30a to introduce an averaging feature. For example, if a final reading is desired which is the average of four analyses performed in sequence, the scaler 105 is adjusted so that it passes every fourth pulse from comparator 64 to counter 106. Switch blade 30a is then actuated through four complete cycles from switch terminals 30b to 30c, the blade returning to terminal 30b each time a counting sequence is completed. Switch blade 30a may be operated either manually or automatically. The result is that only one fourth of the pulses produced by each analysis are recorded by counter 106 and the final total count represents an average of the four. In an actual embodiment of this invention, the averaging feature was designed to indicate the average of four, eight, or sixteen analyses.

Operation

To utilize the apparatus of FIG. 1 in an actual analysis and without the averaging feature, there is first injected into the sample flame 16 a standard containing approximately the average sample concentration to be expected in the analysis. Capacitance 32 is then adjusted until that concentration is indicated by counter 106. Next, a standard containing the maximum amount of sample to be expected is injected into the flame 16. If counter 106 displays the proper concentration, no correction is necessary. However, if the indicated concentration is less than that contained in the sample, switch 128 is closed and potentiometer 114 or 116 are adjusted to cause the counter 106 to display the actual concentration plus the error. The mid-range standard is then employed once more and capacitor 32 is adjusted until the counter display is the proper concentration. The maximum range standard is then employed once more and the curvature control potentiometer 114 or 116 is once more adjusted until the counter displays the maximum concentration plus one-half the error. These last two steps are repeated until the midrange and toprange concentration readouts are correct within the desired degree of accuracy.

While there has been described what is at present considered to be the preferred embodiment of this invention, it will be obvious to those skilled in the art that various changes and modifications may be made therein without departing from the invention. For example, the foregoing description has assumed that spectrophotometer S is of the double beam type with an output voltage $E_o$ proportioned to the reference beam intensity. The system of the invention, however, is equally adapted to use with single beam instruments. In such a circumstance, however, the voltage $E_o$ would be derived from a reference source.

What I claim as new and desire to secure by Letters Patent of the United States is:

1. A measuring circuit having a digital output responsive to the ratio between a first and a second voltage which comprises: a storage capacitor; means for charging said storage capacitor to at least said first voltage; a discharge capacitor connectable across said storage capacitor during spaced, sequential first time periods to discharge said storage capacitor in steps such that each step is a fixed percentage of the voltage on said storage capacitor; means for discharging said discharge capacitor to a reference potential during the second time periods intermediate said first time periods; means for applying a correction voltage to one of the capacitors for controlling the effective magnitude of each quanta of charge removed from the storage capacitor by the discharge capacitor; and means for counting the number of steps required to discharge said storage capacitor from said first to said second voltage.

2. The circuit of claim 1 wherein said correction means comprises: means producing a voltage in series with the discharge capacitor for varying the magnitude of the quanta of the discharge pulses removed from the storage capacitor.

3. The circuit of claim 2 wherein the capacitance of said discharge capacitor is variable.

4. The circuit of claim 1 wherein said means for counting comprises: comparator circuit means responsive to both of said second voltage and the voltage across said storage capacitor during each discharge step to produce a signal pulse when said voltages are different; and a counter connected to count said signal pulses.

5. The circuit of claim 4 wherein the polarities of said signal pulses reverse when the voltage across said storage capacitor becomes less than said second voltage and wherein said comparator means includes means for shunting reversed polarity pulses from said counter.

6. The circuit of claim 1 wherein said counting means counts only every $n$th step during a discharging cycle and wherein means is provided for charging said storage capacitor to said first voltage and discharging to said second voltage $n$ times.

7. The circuit of claim 1 additionally including electronic switching means for alternately paralleling said discharge capacitor with said storage capacitor and discharging said discharge capacitor.

8. A measuring circuit having a digital output responsive to the ratio between a first and a second voltage which comprises: a storage capacitor; means for charging said storage capacitor to at least said first voltage; means for discharging said storage capacitor in steps such that each step is a fixed percentage of the voltage on said storage capacitor; means for controllably charging said storage capacitor during the time it is being discharged;

and means for counting the number of steps required to discharge said storage capacitor from said first to said second voltage.

9. A measuring circuit having a digital output responsive to the ratio between a first voltage and a second voltage proportional to the sample beam intensity of a radiation comparison system which comprises: a storage capacitor; variable discharge capacitor means; first electronic switching means for connecting said discharge capacitor means across said storage capacitor during spaced, sequential, first time periods; second electronic switching means for discharging said discharge capacitor to a reference potential during the second time periods intermediate said first time periods; comparator circuit means responsive to both of said second voltage and the voltage across said storage capacitor during each of said first time periods to produce a signal pulse when said voltages are different; means for counting said signal pulses adjustable to count every $n$th signal pulse; means for charging said storage capacitor to said first voltage and discharging to said second voltage $n$ times; and correction means for controllably charging said storage capacitor during the time it is being discharged.

10. The circuit of claim 9 wherein said first voltage is proportional to the reference beam intensity of said radiation comparison system.

References Cited

UNITED STATES PATENTS

| | | | |
|---|---|---|---|
| 2,977,536 | 3/1961 | Hindel | 324—140 XR |
| 2,999,206 | 9/1961 | Stoddart et al. | 324—140 |
| 3,087,147 | 4/1963 | Norris et al. | 324—111 XR |
| 3,188,455 | 6/1965 | Quick | 324—111 XR |
| 3,237,190 | 2/1966 | Summers | 324—111 XR |
| 3,287,723 | 7/1966 | Metcalf | 324—111 XR |
| 3,296,613 | 1/1967 | Andersen et al. | 324—111 XR |
| 3,316,547 | 4/1967 | Ammann | 324—111 XR |
| 3,368,149 | 2/1968 | Wasserman | 324—111 XR |

RUDOLPH V. ROLINEC, Primary Examiner

E. F. KARLSEN, Assistant Examiner